(12) United States Patent
Montgomery et al.

(10) Patent No.: US 11,879,264 B2
(45) Date of Patent: Jan. 23, 2024

(54) DUAL-PHASE VIBRATION DAMPING BUILDING COUPLING MEMBER WITH LOCK-UP

(71) Applicant: KINETICA DYNAMICS INC., Toronto (CA)

(72) Inventors: Michael Stewart Montgomery, Toronto (CA); Constantin Christopoulos, Toronto (CA)

(73) Assignee: KINETICA DYNAMICS INC., Toronto (CA)

( * ) Notice: Subject to any disclaimer, the term of this patent is extended or adjusted under 35 U.S.C. 154(b) by 0 days.

(21) Appl. No.: 16/840,370

(22) Filed: Apr. 4, 2020

(65) Prior Publication Data

US 2021/0310239 A1 Oct. 7, 2021

(51) Int. Cl.
*E04H 9/02* (2006.01)
*F16F 7/12* (2006.01)

(52) U.S. Cl.
CPC ............ *E04H 9/0215* (2020.05); *F16F 7/128* (2013.01); *E04H 9/024* (2013.01); *E04H 9/027* (2013.01)

(58) Field of Classification Search
CPC .......... E04B 2001/2415; E04B 1/2403; E04B 2001/2448; E04B 2001/2439; E04B 1/98; E04H 9/0237; E04H 9/021; E04H 9/028; E04H 9/02; E04H 9/024; E04H 9/022; E04H 9/0215; F16F 7/128
See application file for complete search history.

(56) References Cited

U.S. PATENT DOCUMENTS

| | | | | |
|---|---|---|---|---|
| 4,409,765 A * | 10/1983 | Pall | ................... | E04B 1/2403 52/167.1 |
| 4,929,008 A * | 5/1990 | Esfandiary | ............. | B60R 19/20 188/376 |
| 5,014,474 A * | 5/1991 | Fyfe | ...................... | E02D 31/08 14/73.5 |
| 5,533,307 A * | 7/1996 | Tsai | ...................... | E04H 9/021 52/167.1 |
| 5,630,298 A * | 5/1997 | Tsai | ...................... | E04H 9/021 52/167.1 |

(Continued)

FOREIGN PATENT DOCUMENTS

| | | |
|---|---|---|
| CN | 207659848 | 7/2018 |
| JP | 2009-513898 A | 4/2009 |

(Continued)

OTHER PUBLICATIONS

Office Action dated Oct. 10, 2023 from JP2022-560489, 5 pgs (including English translation).

*Primary Examiner* — Babajide A Demuren
*Assistant Examiner* — Daniel J Kenny
(74) *Attorney, Agent, or Firm* — Jenna L. Wilson; Wilson Lue LLP

(57) ABSTRACT

A building structure including a plurality of elements extending from a ground surface with at least a first of the elements connected to a second of the elements by a coupling member, the coupling member including a damping element for damping vibrations in the building structure and a means for limiting the deformation of the damping element when the relative movement exceeds a maximum displacement at which damage occurs to the damping element.

12 Claims, 17 Drawing Sheets

(56) References Cited

U.S. PATENT DOCUMENTS

| | | | |
|---|---|---|---|
| 7,076,926 B2* | 7/2006 | Kasai | E04H 9/02 |
| | | | 52/167.1 |
| 7,987,639 B2 | 8/2011 | Christopoulos | |
| 8,806,836 B2* | 8/2014 | James | E04G 23/0218 |
| | | | 52/698 |
| 8,844,205 B2* | 9/2014 | Michael | F16F 9/303 |
| | | | 52/167.8 |
| 8,881,491 B2 | 11/2014 | Christopoulos | |
| 10,184,244 B2* | 1/2019 | Choi | E04B 1/98 |
| 10,323,430 B1* | 6/2019 | Pall | E04H 9/024 |
| 10,563,418 B2* | 2/2020 | Pall | E04H 9/024 |
| 2015/0135611 A1* | 5/2015 | Beard | E04H 9/0237 |
| | | | 52/167.3 |
| 2015/0159369 A1* | 6/2015 | Chen | E04B 1/2403 |
| | | | 52/167.8 |
| 2016/0167299 A1* | 6/2016 | Jallouli | G02B 1/041 |
| | | | 351/159.73 |

FOREIGN PATENT DOCUMENTS

| | | |
|---|---|---|
| JP | 2012-225411 A | 11/2012 |
| JP | 2013-506066 A | 2/2013 |
| JP | 2014-507577 A | 3/2014 |
| JP | 2018-131753 A1 | 8/2018 |
| KR | 20120136667 | 12/2012 |

* cited by examiner

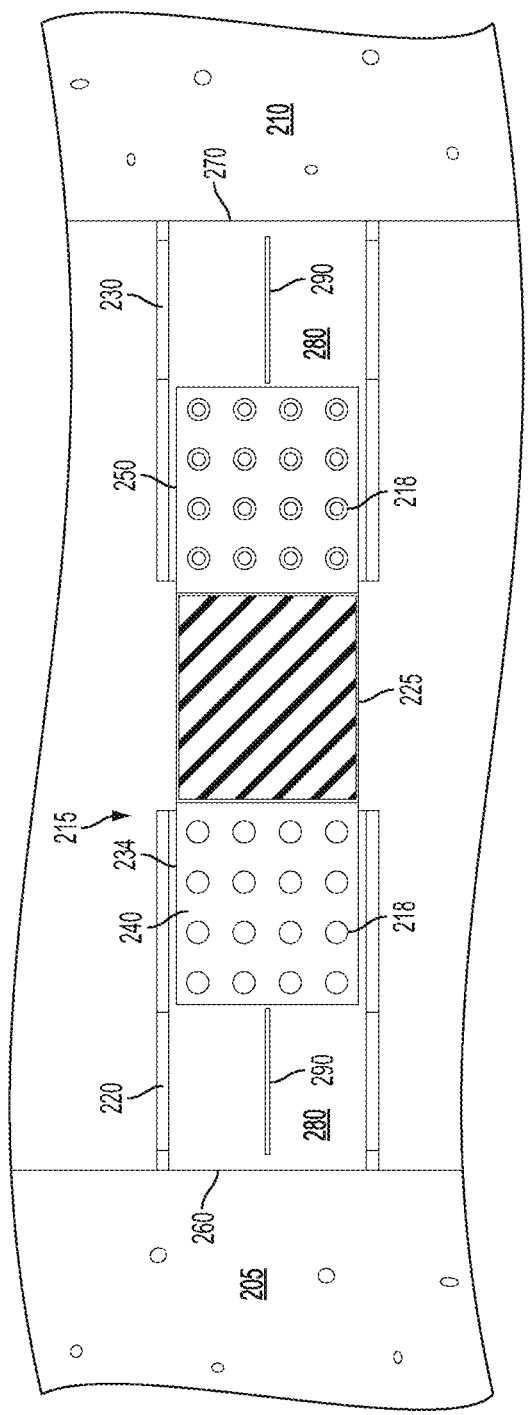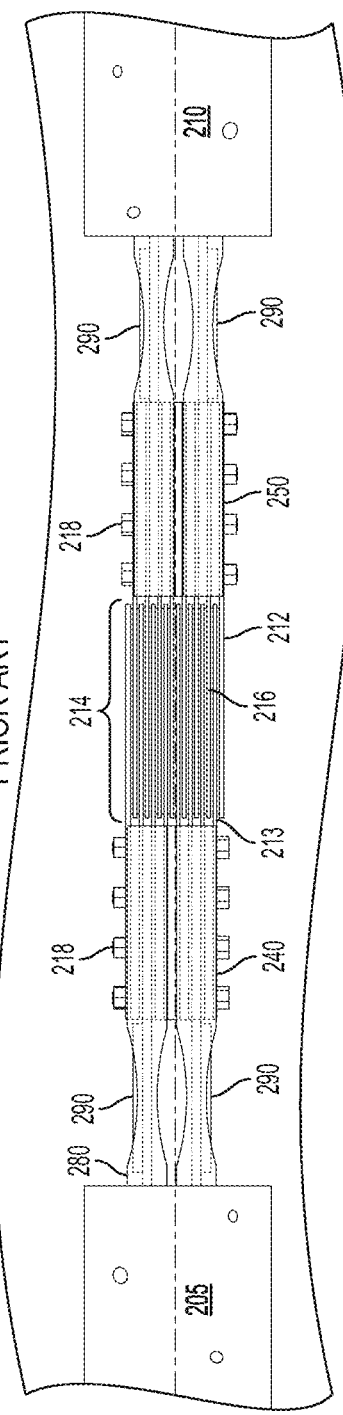
FIG. 2A
PRIOR ART
FIG. 2B
PRIOR ART

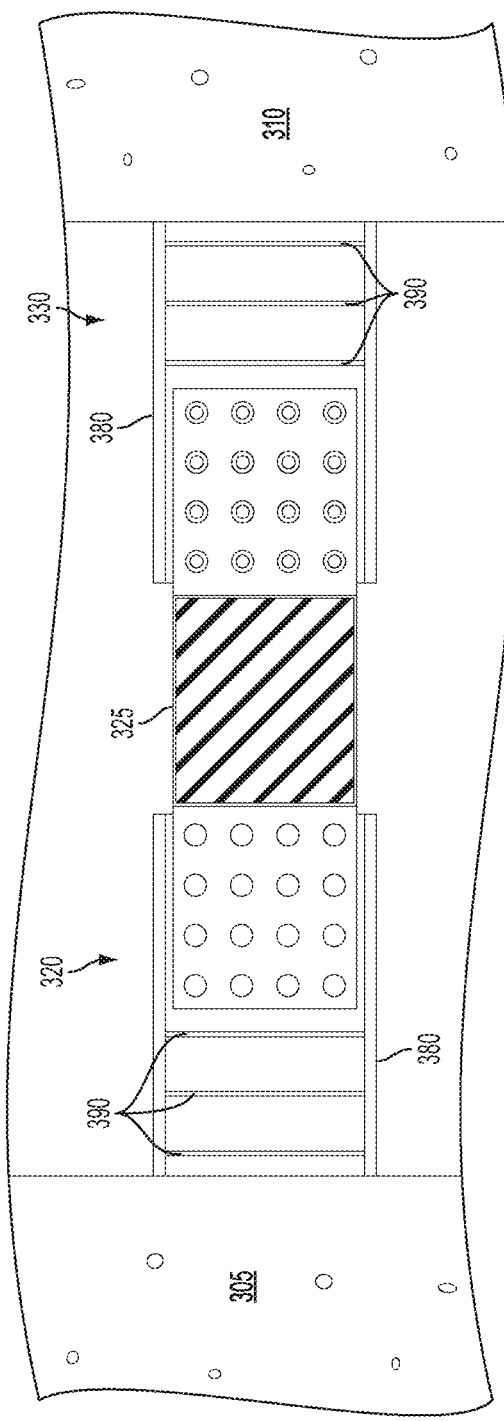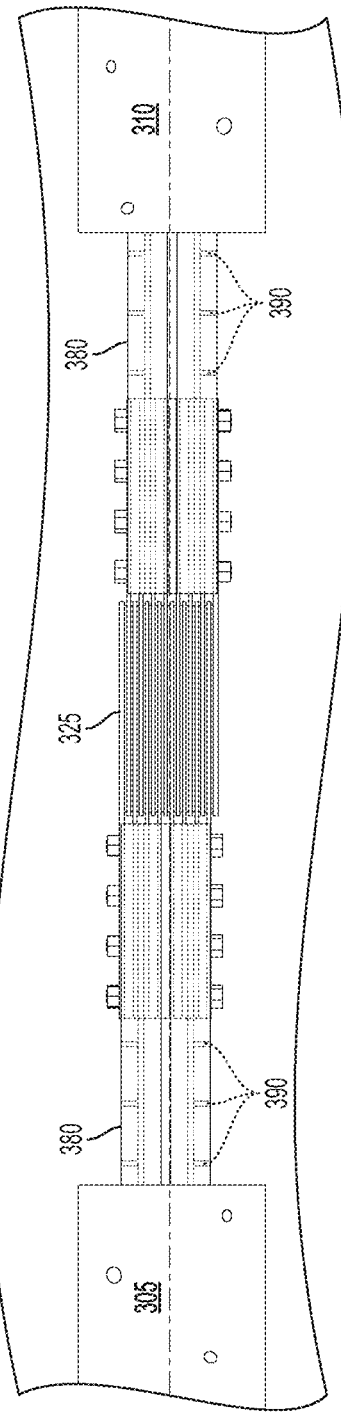
FIG. 3A
PRIOR ART
FIG. 3B
PRIOR ART

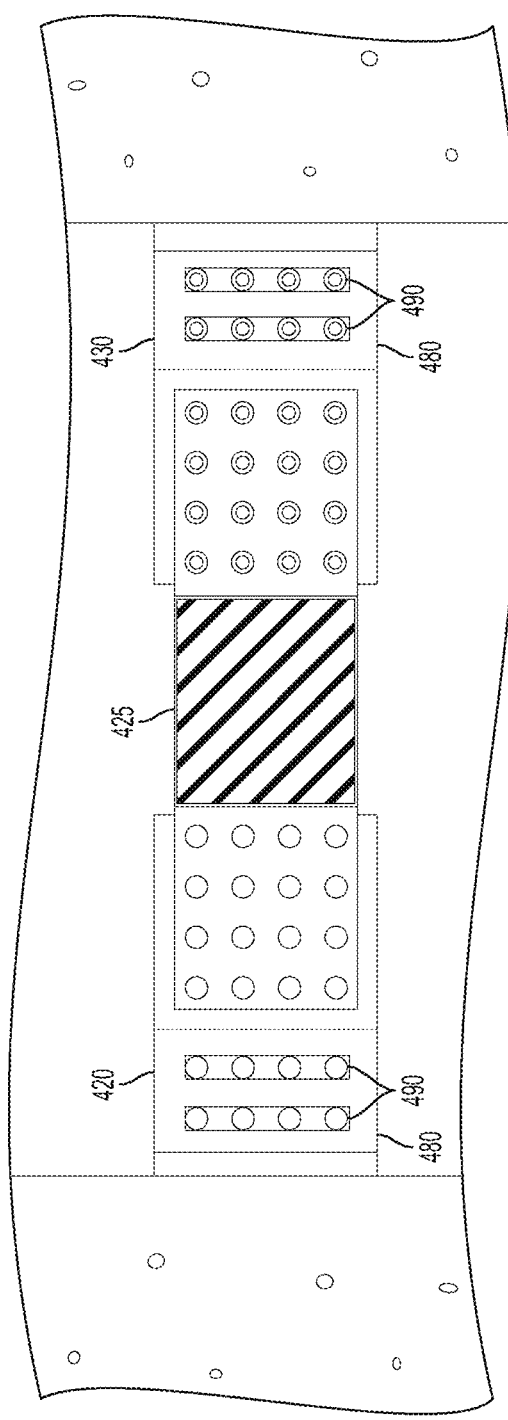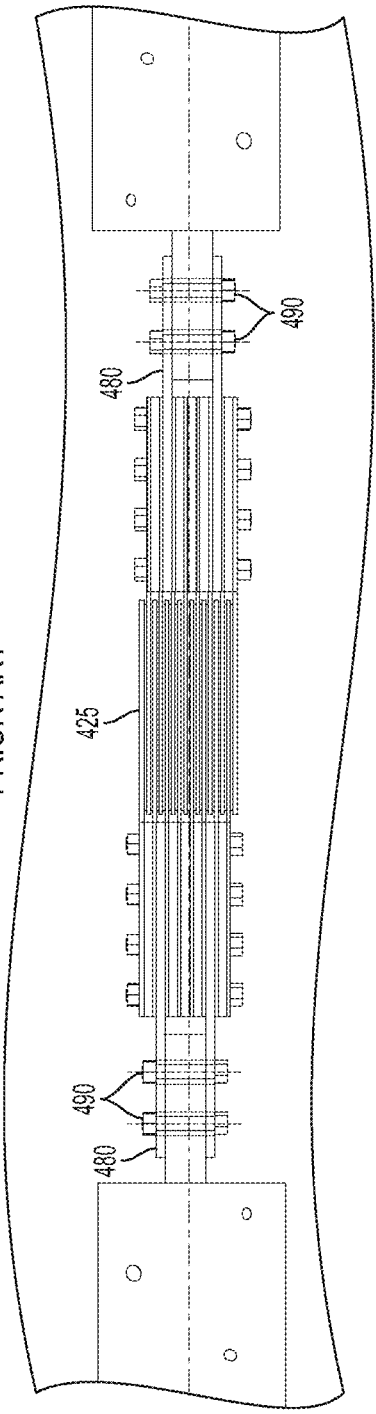
FIG. 4A
PRIOR ART
FIG. 4B
PRIOR ART

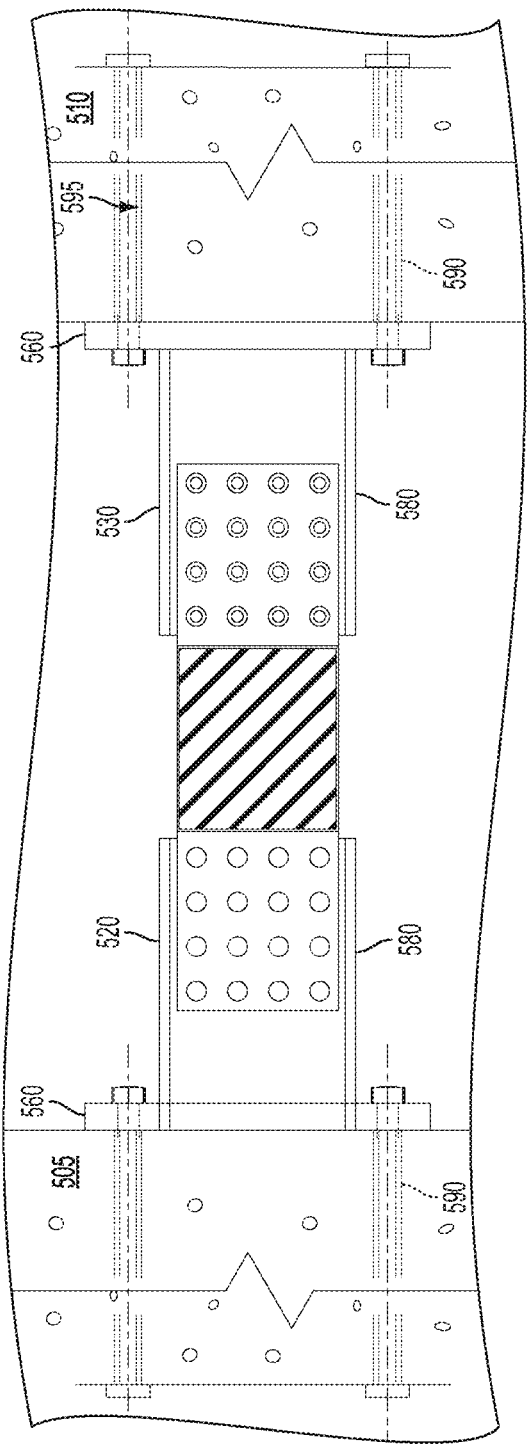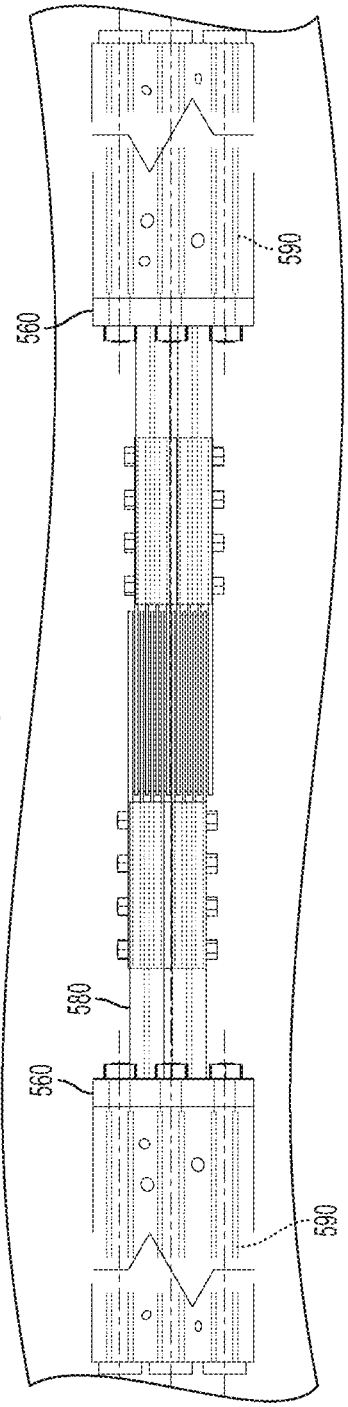
FIG. 5A
PRIOR ART
FIG. 5B
PRIOR ART

DUAL-PHASE VIBRATION DAMPING BUILDING COUPLING MEMBER WITH LOCK-UP

FIELD OF THE INVENTION

The present invention relates generally to the field of building structures, and more specifically to vibration damping mechanisms for use in building structures, preferably having dual phase damping with a damage mitigating lock-up.

BACKGROUND OF THE INVENTION

Modern buildings, using typical construction components such as reinforced concrete shear walls, structural steel braced frames, structural steel or reinforced concrete moment frames or combinations thereof, have low inherent damping properties which decrease with building height. Due to this low inherent damping, high-rise buildings, in particular, tend to be susceptible to excessive vibrations caused by dynamic loads. Excessive accelerations and torsional velocities can cause occupant discomfort, while excessive displacements can cause damage to non-structural and structural elements. For this reason it is advantageous to provide additional sources of damping to control these excessive vibrations and reduce the overall building response to dynamic loads. These dynamic loads can include both those resulting from wind loads and earthquake loads.

Currently available systems for controlling displacements, velocities and accelerations in such structures consist of passive systems such as supplemental dampers and vibration absorbers as well as active systems.

Passive supplemental dampers such as hysteretic, viscous and visco-elastic dampers are currently used in typical braced configurations and are activated under axial deformations. While this may be effective in adding damping to some structural configurations, where under this typical braced configuration the brace elements undergo significant axial deformations, they are less effective for other structural systems, such as structural systems commonly used in high rise buildings where the primary mode of lateral deformation does not cause sufficient axial deformation in typical bracing elements to effectively activate such dampers. In order to increase the deformations to an extent sufficient to activate the dampers, special configurations using toggle bracers or scissor braces to amplify the displacements have been used.

Vibration absorbers such as Tuned Mass Dampers (TMD) and Tuned Liquid Dampers (TLD) are also used to reduce the deflections, velocities and accelerations of such structures during wind loading. They typically consist of a mechanical vibrating system inserted on the top floor of buildings in order to maximize their effectiveness. This has the disadvantage of using up some of the most valuable real estate within the building in addition to being expensive to design and to build. They also act in a limited frequency range as they must be tuned to a single mode of vibration.

Active systems require an external power source, an actuating force and extensive hardware and software control systems. As a result, they are expensive to design and implement, and are susceptible to power outages or failure of the control system.

One solution to the above-identified problems with existing systems was proposed in PCT Application No. PCT/CA2006/000985 filed Jun. 16, 2006, entitled "Fork Configuration Dampers and Method of Using Same." The system in that application presents a configuration for damping systems in buildings for interconnecting two elements of a structure that undergo relative movement with respect to each other. The damping system of the '985 application discloses a first set of plates fixed to a first generally vertically extending structural element provided for resisting lateral loads and a second set of plates fixed to a second generally vertically extending structural element provided for resisting lateral loads. The vertically extending structural elements may, for example, be walls, columns, frames or other vertical elements in a building. The first and second sets of plates each comprise a plurality of substantially parallel, spaced apart plate elements arranged such that the plate elements of the first set of plates are interdigitated with the plate elements of the second set of plates. A damping material is provided to couple the first set of plates to the second set of plates. In this manner, as the vertically extending structural elements undergo relative movement with respect to each other due to the application of lateral loads to the building, the first and second set of plates are displaced in a vertical shear movement and act to damp vibrations in the structure via the energy dissipating material resisting the displacement of the plates with respect to each other.

One improvement over the aforementioned application was proposed in PCT Application No. PCT/CA2012/050013 filed Jan. 11, 2012 entitled "Coupling Member for Damping Vibrations in Building Structures", in which a damage-mitigating fuse element is provided to avoid damaging the damping member. However, the fuse requires modifications to the structural element itself that has some limitations in implementation. It would furthermore be beneficial to provide damage mitigation functionality on elements other than the main structural member itself.

SUMMARY OF THE INVENTION

In one embodiment of the invention, there is described a building structure including a plurality of elements extending from a ground surface with at least a first of the elements connected to a second of the elements by a coupling member, the coupling member including a damping element for damping vibrations in the building structure; and a means for limiting the deformation of the damping element when the relative movement exceeds a maximum displacement at which damage occurs to the damping element.

In one aspect of the invention, the damping element comprises first and second sets of two or more plates each, wherein the plates in the first set are interdigitated with the plates in the second, and spaced from each other in a direction substantially either parallel or perpendicular to the ground surface, and a damping material disposed between each plate in the sets of plates, and the means for limiting deformation includes a plurality of slots in a connecting element of the coupling member and a plurality of bolt holes in cover plates with a bolt passing through each corresponding bolt hole and slot, whereby in normal operation the bolts move freely in the slots and when the relative movement excess the maximum displacement the bolts engage walls of the slots to prevent further deformation of the damping material.

In one aspect of the invention, the damping material comprises a viscoelastic material; the damping element damping vibrations as the damping element undergoes shear deformation as each plate in the set of plates is displaced in a vertical direction under resistance of the damping material.

In one aspect of the invention, the slots and the bolts are sized and otherwise dimensioned based on the maximum displacement.

In one aspect of the invention, there is a static stiffness increasing structural member attached to a top surface of the damping element.

In one aspect of the invention, the static stiffness increasing member comprises a steel plate.

In one aspect of the invention, at least one of a first and second fuse member is connected to at least one of first and second ends of the damping element respectively.

In one aspect of the invention, the fuse member is from a material, and otherwise sized and dimensioned to exhibit semi-rigid behavior when the damping element undergoes deformation due to loads below a predetermined load limit and to undergo deformation when loads reach the predetermined load limit, such that the damping element is prevented from deforming due to loads above the predetermined load limit.

In one aspect of the invention, the damping element comprises first and second sets of two or more plates each, wherein the plates in the first set and interdigitated with the plates in the second, and spaced from each other in a direction substantially either parallel or perpendicular to the ground surface, and a damping material disposed between each plate in the sets of plates, and the means for limiting deformation includes a flange overhang of the connecting steel elements, that prevents further deformation of the damping material.

In one aspect of the invention, the damping element comprises first and second sets of two or more plates each, wherein the plates in the first set and interdigitated with the plates in the second, and spaced from each other in a direction substantially either parallel or perpendicular to the ground surface, and a damping material disposed between each plate in the sets of plates, and the means for limiting deformation includes strain limiting straps, that prevents further deformation of the damping material.

BRIEF DESCRIPTION OF THE DRAWINGS

Embodiments will now be described, by way of example only, with reference to the attached. Figures, wherein:

FIGS. 2A and 2B are front and bottom views, respectively, showing a prior art coupling.

FIGS. 3 A and 3B are front and bottom views, respectively, showing another prior art coupling member.

FIGS. 4A and 4B are front and bottom views, respectively, showing another prior art coupling member.

FIGS. 5A and 5B are front and bottom views, respectively, showing another prior art coupling member.

DETAILED DESCRIPTION

Figure 1:
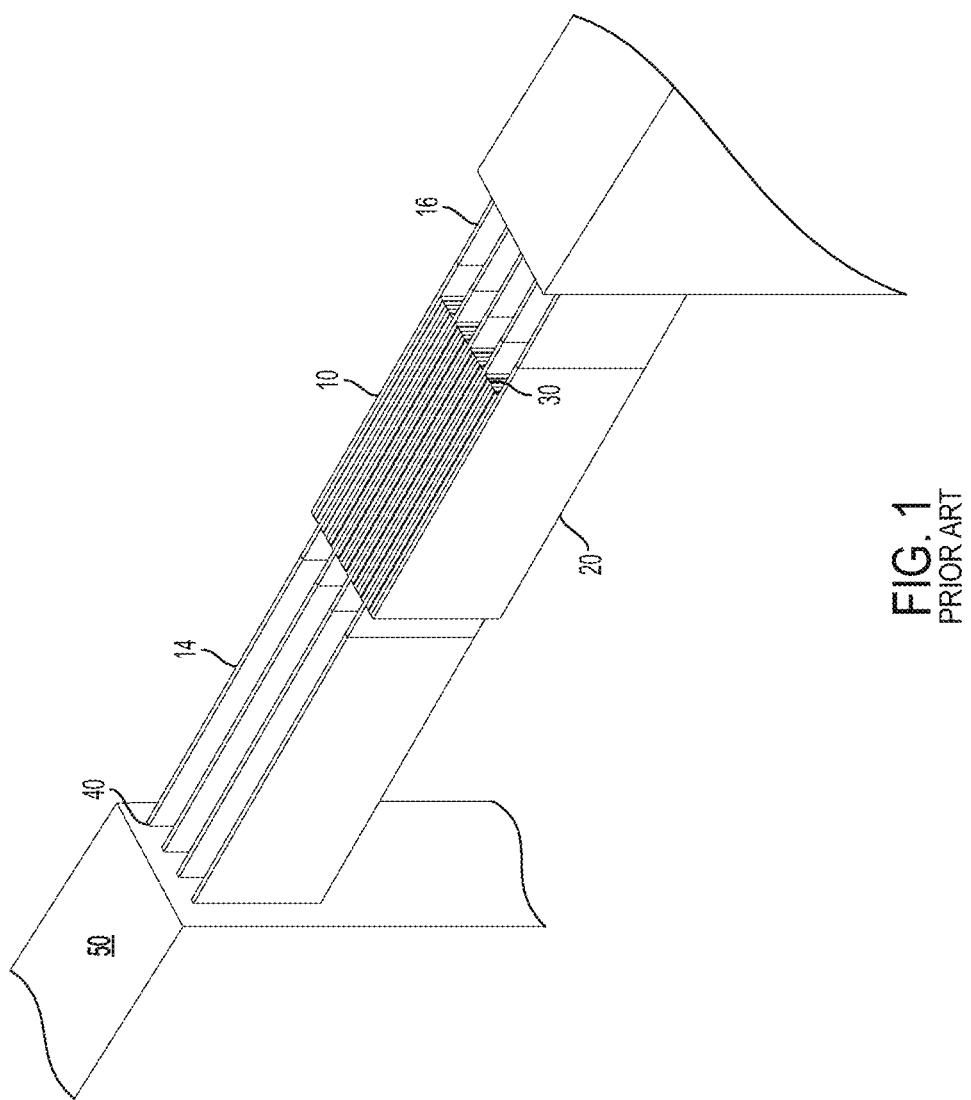
FIG. 1 is a perspective view of a prior art damping element for use in building structures.

In applicant's prior PCT Application No. PCT/CA2006/000985 filed Jun. 16, 2006, entitled "Fork Configuration Dampers and Method of Using Same", the contents of which are herein incorporated by reference, there was disclosed a damping system for use in building structures that included a damping element as shown in FIG. 1. As illustrated, the damping element 10 includes two sets 14, 16 of two or more plates 20 spaced from each other in a direction substantially parallel to a ground surface, and a damping material 30 disposed between each plate 20 in the sets of plates. In practice, the set of plates are interdigitated with each other, and have ends 40 rigidly connected to vertical elements 50 in the building structure. The vertical elements 50 resist lateral loads applied to the building structure, and move relative to each other when significant loads are applied. The plates 20, and the damping material 30, disposed there between undergo shear deformation as the vertical elements 50 move with respect to each other, and accordingly, by virtue of the damping material, provides damping in the building structure as the steel plates 20 move relative to each other. The damping material is preferably a viscoelastic material.

In aforementioned PCT/CA2012/050013, an additional failsafe mechanism for extreme loading conditions is described. In that reference, the damping system provides for one or more fuse members acting as a second damping phase and connected to the damping element. The fuse member, as described in more detail below, is designed, sized and otherwise dimensioned to exhibit semi-rigid behavior when the damping element undergoes deformation due to lateral loads below a predetermined load limit and to undergo deformation without a substantial increase in the loads carried by the fuse and the damping elements when lateral loads exceed said predetermined load limit, such that said damping element is prevented from deforming beyond their predefined deformation limit. In this description, reference is made to the fuse being activated when the lateral loads exceed the predetermined load limit in this context. The fuse represents a second phase of damping capabilities in the structure.

The predetermined load limit is preferably selected at a load limit below which a damage incident occurs. In practice, lateral loads applied to the building structure are resisted by the vertical elements. These lateral loads result in deformations, particularly shear deformations in the damping system acting as a coupling member between the vertical elements. At a given loading of the damping system, the shear, or other, deformation in the damping system results in a damage incident occurring. For the purposes of this application, a damage incident is defined as one that would cause permanent, near permanent, or similar damage that cannot be repaired in situ to the damping element or renders the damping system inefficient in providing damping to the structure. Preferably, the damage incident is one or more of ripping of the damping material, debonding of damping material from a plate to which the damping material is connected, failure of a plate forming part of the damping element, failure of a means for connecting elements in the damping element, failure of a weld connecting the damping element or the column element, and failure of a connecting means for the coupling member, or and combination of same. Other damage incidents or failure modes are also contemplated, including but not limited to, failure of vertical elements to which the dampers are attached. Accordingly, the fuse member as herein described undergoes deformation after a predetermined activation load is reached, without any substantial increase in the load carried by the fuse member and/or by the damping element to thereby protect the coupling member from all expected damage incidents.

In order to implement the fuse member, one or more beam members are connected in parallel which, in combination, exhibit semi-rigid behavior when loaded at levels below the predetermined load limit. Optionally, the beam members further include a stiffener for stabilizing the beam members during elevated loading conditions.

Figure 2C:
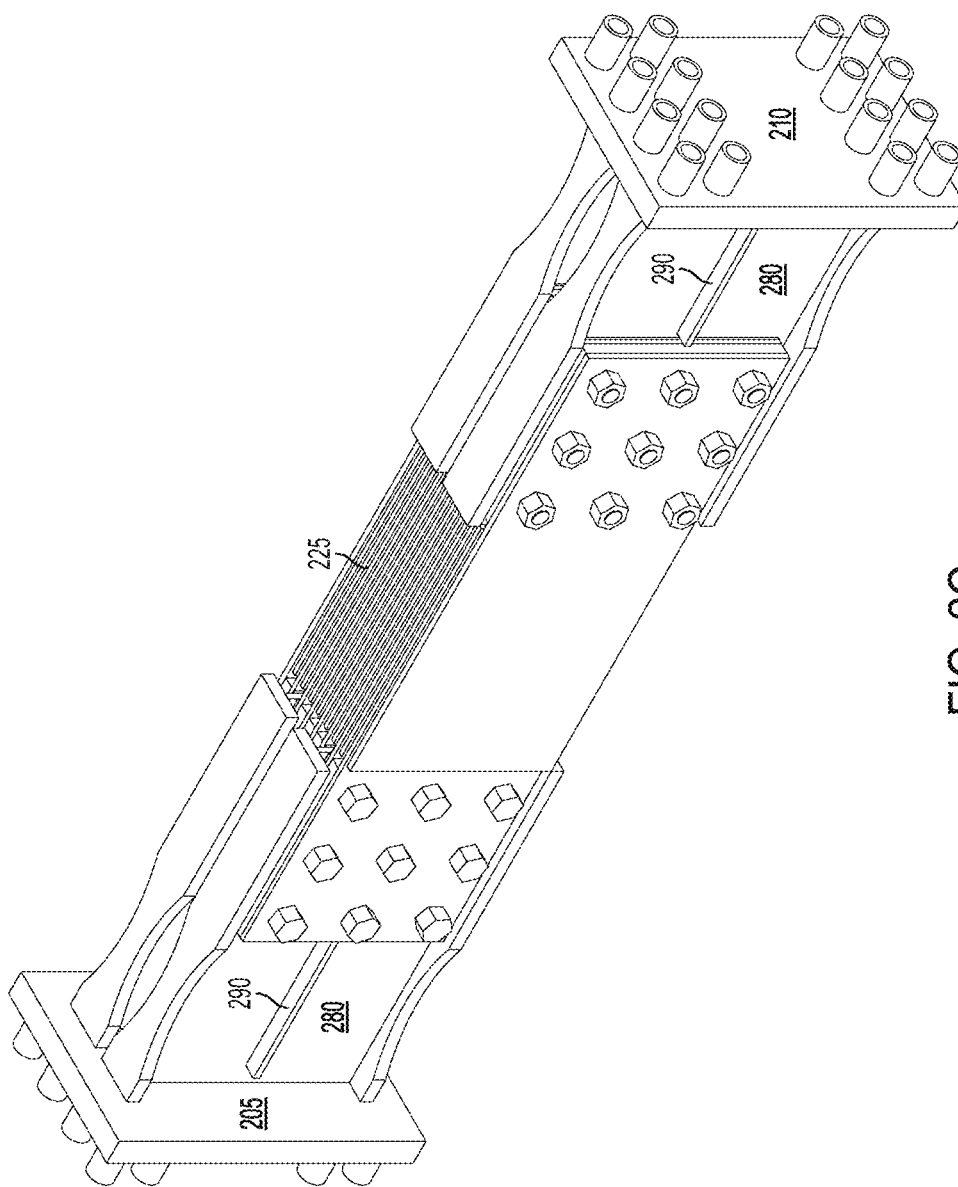
FIG. 2C is a perspective view of the prior art coupling element of FIGS. 2 A and 2B.

Referring now to FIGS. 2A, 2B and 2C, there is shown one prior art embodiment where there is shown a cross-section of first 205 and second 210 vertical elements that are two of a plurality of vertical elements extending vertically from a ground surface (not shown). For the purposes of this application, it will be understood that the terms vertical and vertically are used in their ordinary sense with respect to building structures, and that is, in a direction generally perpendicular to the ground surface. In addition, the term horizontally, when used, refers to a direction that is generally parallel to the ground surface. A coupling member 215 connects the first vertical element 205 with the second vertical element 210. The coupling member 215 as herein disclosed is operable to replace or be used in lieu of rigid coupling members traditionally used in building structures.

Coupling member 215 preferably includes a damping element 225 for damping vibrations in the building structure resulting from relative movement between the first 205 and second 210 vertical elements due to lateral loads being applied to the building structure. An exemplary embodiment of a damping element 225 is described further below. Regardless of the particular implementation of the damping element, the damping element will have a damage incidence limit determined according to design constraints and loads typically expected during operation that result in deformation of the damping element due to relative movement between the vertical elements 205 and 210, Once the load level in the damping element reaches a predetermined limit, due to elevated loads being applied to the building structure, the damping element will, in the absence of the fuse members, as described below, become permanently deformed, damaged, or others rendered unsuitable for use. This would render the damping element ineffective for subsequent loading cycles.

In order to address this issue, an optional first fuse member 220 and a second fuse member 230 are connected to a first end 240 and a second end 250 of the damping element 225, respectively. The fuse members 220, 230 are selected from a material, and otherwise sized and otherwise dimensioned to exhibit semi-rigid behavior when the damping element 225 undergoes deformation due to loads below a predetermined load limit and to activate and therefore undergo deformation when loads reach the predetermined load limit without any substantial increase in the load carried by the fuse and by the damping element, 225 thereby preventing the damping element 225 from deforming due to loads above the predetermined load limit. As described above, the predetermined load limit is one at which a damage incident occurs that would render the damping element 225 unsuitable for continued use, based on any number of factors.

A first connecting member 260 is provided to connect the first fuse member 220 to the first vertical element 205, and similarly, a second connecting member 270 is provided to connect the second fuse member 230 to the second vertical element 210. The connecting members 260, 270 preferably provide a semi-rigid connection with the vertical elements 205, 210, such that possible movement caused by any bending moments at the connecting members 260, 270 is fully, constrained, prior to activation of the fuse.

The fuse members 220, 230 preferably include a beam portion 280 and optionally, a stiffener portion 290. Stiffener portion 290 is designed, sized and otherwise dimensioned to be functionally connected to the beam portion 280, and to provide stabilizing support to the beam portion 280, when the loads applied to the vertical elements reach the predetermined loads. Accordingly, when the fuse members 220, 230 have been activated, the stiffener portion 290 acts to provide additional deformation capacity to the fuse members 220, 230 themselves. This occurs without any substantial increase in the loads carried by the fuse and the damping element.

In the illustrated embodiment, the stiffener portion 290 may be reinforcing member 290 that is connected to the beam portion 280, and arranged in parallel with the ground such that the stiffener portion 290 provides stability against the beam portion 280 buckling while it is yielding in flexure when the applied lateral loads reach and/or exceed the predetermined load. For clarity, where reference is made throughout the description and claims of the applied loads reaching the predetermined load, the predetermined load is one at which loads below this value do not result in a damage incident to the damping element or connections related thereto that would render the damping element unsuitable for use. The types of damages contemplated are discussed above, but are not limited to same.

The damping element 225 preferably includes two sets of plates 212, 213 having at least two, and more preferably, a plurality of plates spaced apart in the horizontal direction. The sets of plates 212, 213 are inter digitated, and have an overlapping region 214 where a portion of half of the plates in the set overlaps. In this overlapping region 214, there is provided a damping material 216, preferably a viscoelastic material, that is fixed to each plate on either side of the plates, as illustrated. On either side of the overlapping region 214, are connection means 218 that hold the set of plates together, and the damping material 216 in compression at the overlapping region 214. As illustrated, connection means 218 are preferably bolts.

As shown in FIG. 21), an optional static stiffness increasing member 232 may be attached to a top surface 234 of the sets of plates 212, 213. In a preferred embodiment, the stiffness increasing member 232 is a plate, and preferably a steel plate. Other static stiffness increasing members 232 are also contemplated, including but not limited to, angle sections, "u" sections and other members that are able to perform the desired function as described. In operation, the plate member 232 serves to increase the static stiffness of the damping element 215. In the preferred embodiment, the plate 232 adds to the static stiffness of the damper such that under static lateral loads caused by wind pressure on the building which are also applied in combination with dynamic lateral loads the structure is stiffer and sustains less deformation.

The static stiffness increasing member 232, in any of its structural forms herein described, may be connected to the top and/or the bottom of the coupling member. One side of the member 232 is preferably connected to one of the connecting elements and the other side of the structural element is connected to other connecting element. For clarity, the member 232 is not connected to the sets of plates 212, 213 that are bonded to the viscoelastic material. In another embodiment of the same, the member 232 may be directly embedded into the vertical elements or walls, a small distance above and below, respectively but are not connected to the damper element. In operation, this also increases the coupling effect under static loads. In addition, the increase of the overall stiffness of the structure caused by the installation of the static stiffness increasing member 232 also reduces the vibrational period of the structure as a whole, which in turn reduces the dynamic effects of the wind loading on the structure.

Figure 2D:
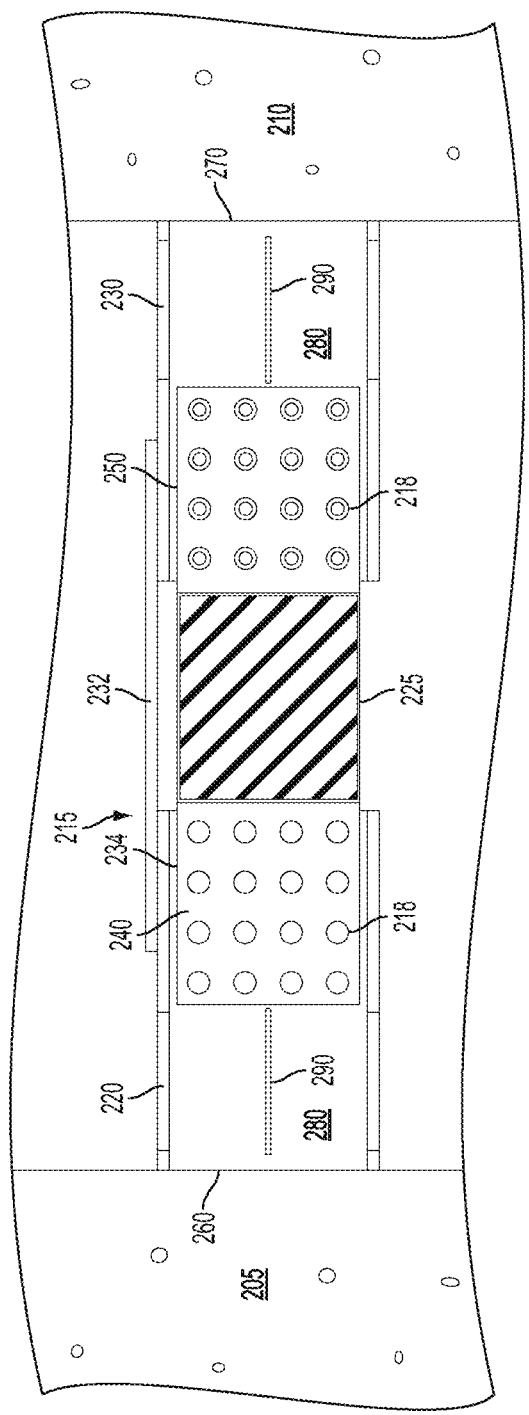
FIG. 2D is a front view of the prior art coupling member of FIGS. 2A and 2B including an optional static stiffness increasing member.

Various other implementations of a fuse member will now be described. Elements corresponding directly to those that have been described and illustrated with respect to FIG. 2 are numbered correspondingly in the hundreds for the respective figure number, but are not described in further detail, except insofar as it is necessary for describing particular aspects, variations or embodiments.

Referring now to FIGS. 3A and 3B, there is shown fuse members 320 and 330 made up of beam portion 380 and stiffener portion 390. In this embodiment, stiffener portion 390 is at least one, and preferably a plurality of, reinforcing members 390 connected to the web and between the flanges of the fuse, and arranged in parallel with the vertical elements 305, 310 such that the stiffener portion 390 provides stability against buckling in the fuse element when the applied lateral loads exceed the predetermined load Referring now to FIGS. 4A and 4B, there are shown fuse members 420 and 430. The fuse members 420 and 430 are made up of semi rigid plates 480, clamped (or otherwise attached) to plates extending from the sets of plates in the damper by connecting means 490. As illustrated, the connecting means 490 are bolts that prevent slippage of the plates with respect to the semi-rigid plates 480. When the predetermined friction force limit is reached, the plates slip, and the semi-rigid plates move relative to another. Accordingly, the fuse in this embodiment is activated by slippage of the bolted connection, and therefore, the bolted connection itself forms the fuse mechanism in this embodiment. Horizontal or rotational movement in the bolts may be accommodated through the connection by an inclined connection portion.

Referring now to FIGS. 5A and 5B, there is shown another prior art embodiment in which fuse members 520 and 530 are made up of an axial force limiting member 595 running through a duct 590 embedded in the vertical elements 505, 510, and attached to the end-plate connector 560. In operation, the axial force limiting members 595 limit the axial forces transmitted to the damper when the predefined load limit is reached. The axial yielding of the members 595 allows for a limit on the loads imparted in the damping system.

Various means for connecting the various fuse members described above to the vertical elements are contemplated. Advantageously, in some embodiments as will be apparent in their respect descriptions below, the means for connecting is preferably provided to permit the removal, repair and/or replacement of the coupling members, in part or in their entirety, following an incident of elevated loading in which the force limiting members are activated by reaching the predefined force limit.

Figure 6:
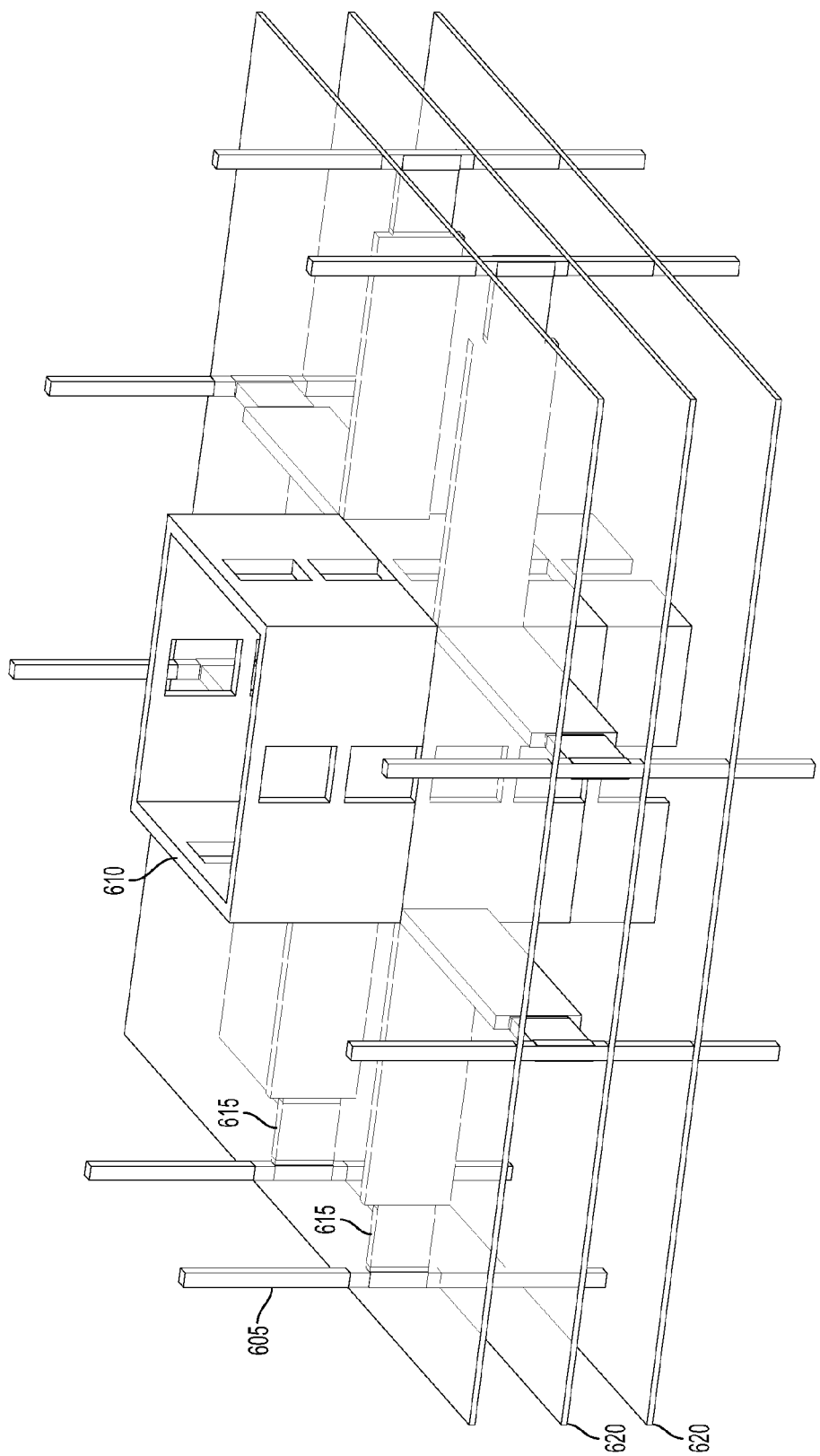
FIG. 6 shows an outrigger building configuration.
Figure 7:
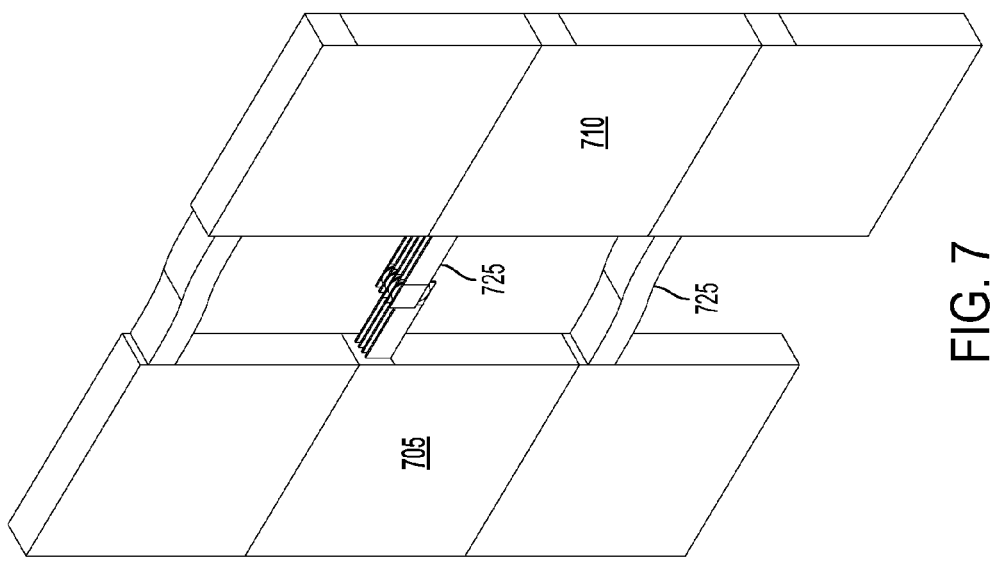
FIG. 7 shows a building structure in which embodiments of the invention may be applied.

For example, referring to FIG. 6, there is shown an outrigger building configuration, where a central building vertical 610 has a plurality of outer vertical elements 605 spaced therefore, with the coupling member 615 adjoining each of the outer vertical elements 605 to the central building vertical 610. Various floors 620 in the building structure are also shown. It will be apparent that the coupling member 615 is illustrated schematically only, and could be any of the coupling members as described with respect to FIGS. 2 to 5. Furthermore, the connection means for coupling to the verticals 605, 610 may be as herein described. FIG. 7 shows a general implementation in which coupling members 725 are used to connect two verticals 705, 710 in a building structure.

Figure 8A:
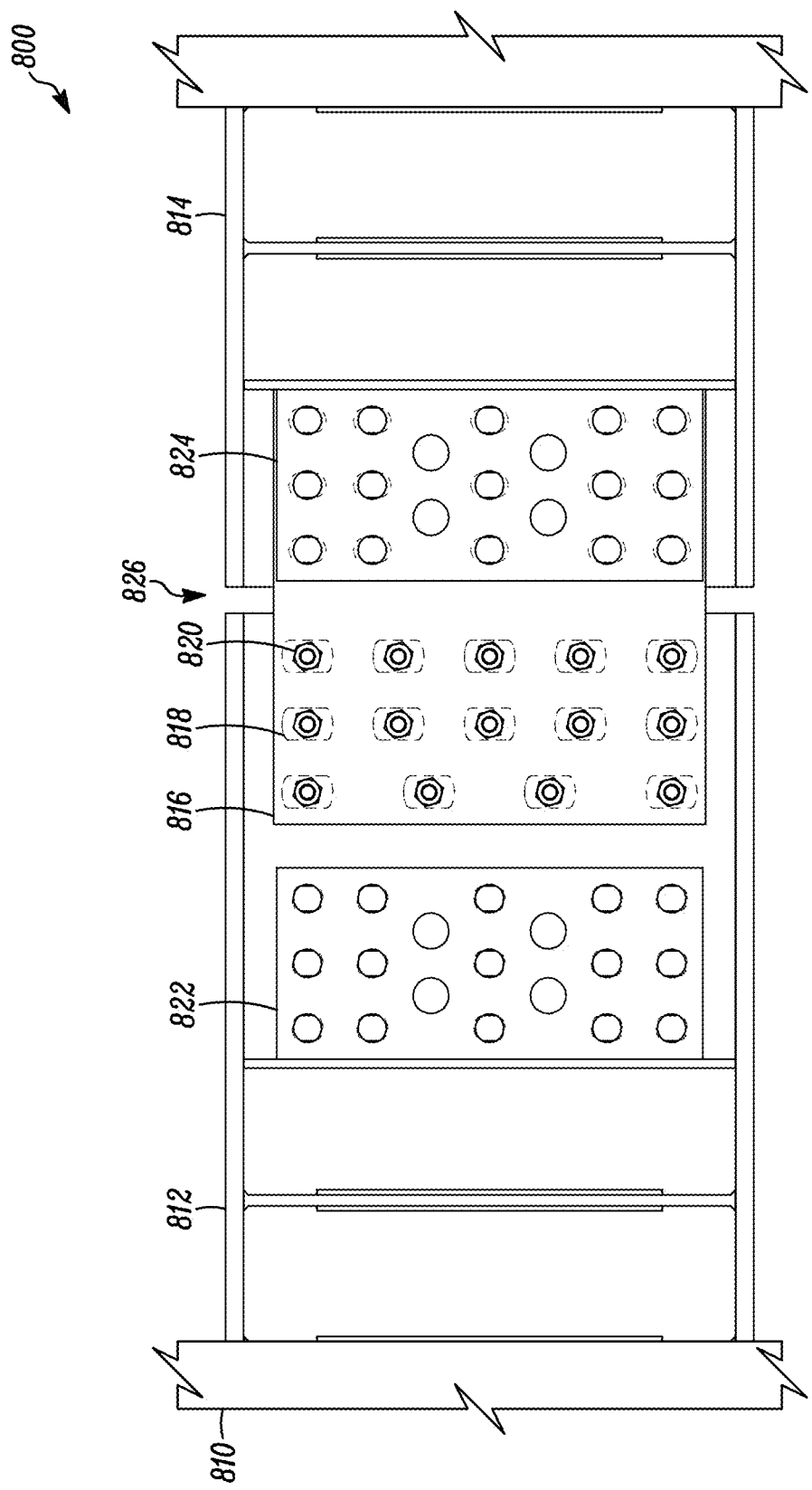
FIG. 8A shows a front view of the coupling member according to one embodiment of the invention.
Figure 8B:
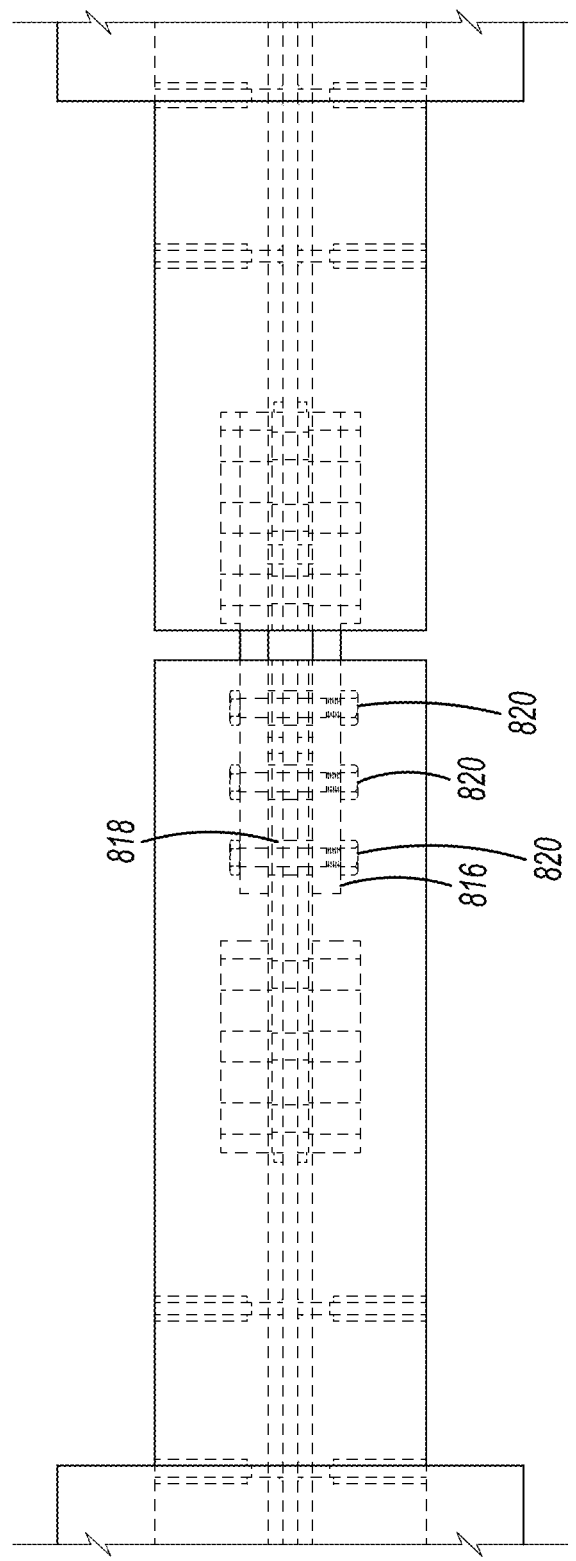
FIG. 8B shows a top view of the coupling member of FIG. 8A.

The improvements described in this application are preferably applied to the system described in the aforementioned PCT Application No. PCT/CA2006/000985 and/or PCT/CA2012/050013, but may also be applied to other damping systems used in building structures, and particularly tall building structures where vibrations caused by lateral loads being applied to the building structure of concern. Referring now to FIGS. 8A and 8B, there is shown a preferred embodiment 800 of the invention, which may be applied to any of the previously described prior art embodiments with or without the fuse element. In FIG. 8A, a front view of the coupling member including slots and bolts prior to locking up according to one embodiment of the invention is shown. The coupling member includes connecting elements 880 and 882 connected to vertical elements such as pillars 810. These connecting elements 880 and 882 may be steel beams or plates, similar to the beams 280 and 380 shown in FIGS. 2A to 3B or plates 480 shown in FIGS. 4A and 4B, and may include stiffeners 884, similar to the stiffener portions 290, 390 in FIGS. 2A to 3B, For clarity, the damping element (e.g., damping element 225 in FIG. 2A) is not shown, but those skilled in the art will appreciate that similarly to FIGS. 2A to 2D, this may be a damping element including two sets of plates having at least two, and more preferably, a plurality of plates spaced apart in the horizontal direction. The sets of plates are interdigitated, and have an overlapping region where a portion of half of the plates in the set overlaps. In this overlapping region, there is provided a damping material, preferably a viscoelastic material, that is fixed to each plate on either side of the plates, as illustrated for example in FIG. 2B. On either side of the overlapping region, are connection means that hold the set of plates together, and the damping material in compression at the overlapping region. As illustrated, connection means is provided by the bolt holes shown collectively as 822 and 824.

In an exemplary embodiment of the present invention, damage is either controlled or deformation of the damper is prevented from occurring beyond the point of permanent deformation by a plurality of slots 818 and a plurality of bolts 820 extending through the slots. As can be seen in FIGS. 8A and 8B, the slots 818 are provided in one of the connecting elements 880. From comparison to FIGS. 2A to 5B, it can be seen that the slots 818 are generally provided in the same region as the overlapping region of the damping element comprising the interdigitated plates and the viscoelastic material. Holes through which the bolts 820 pass are provided on cover plates 816 at the front and rear sides of the connecting element 880, and thus behind the overlapping regions of the damper. As can be seen in FIG. 8A, the cover plates 816 are also aligned with a plate comprising the connection means 824 holding the damper (not shown), and are thus fixed to the second connecting element 882 by the connection means 824. During normal operation, the viscoelastic member of the damper is free to deform and damp vibrations as herein described, and as described in the two PCT applications discussed in the Background.

Figure 9:
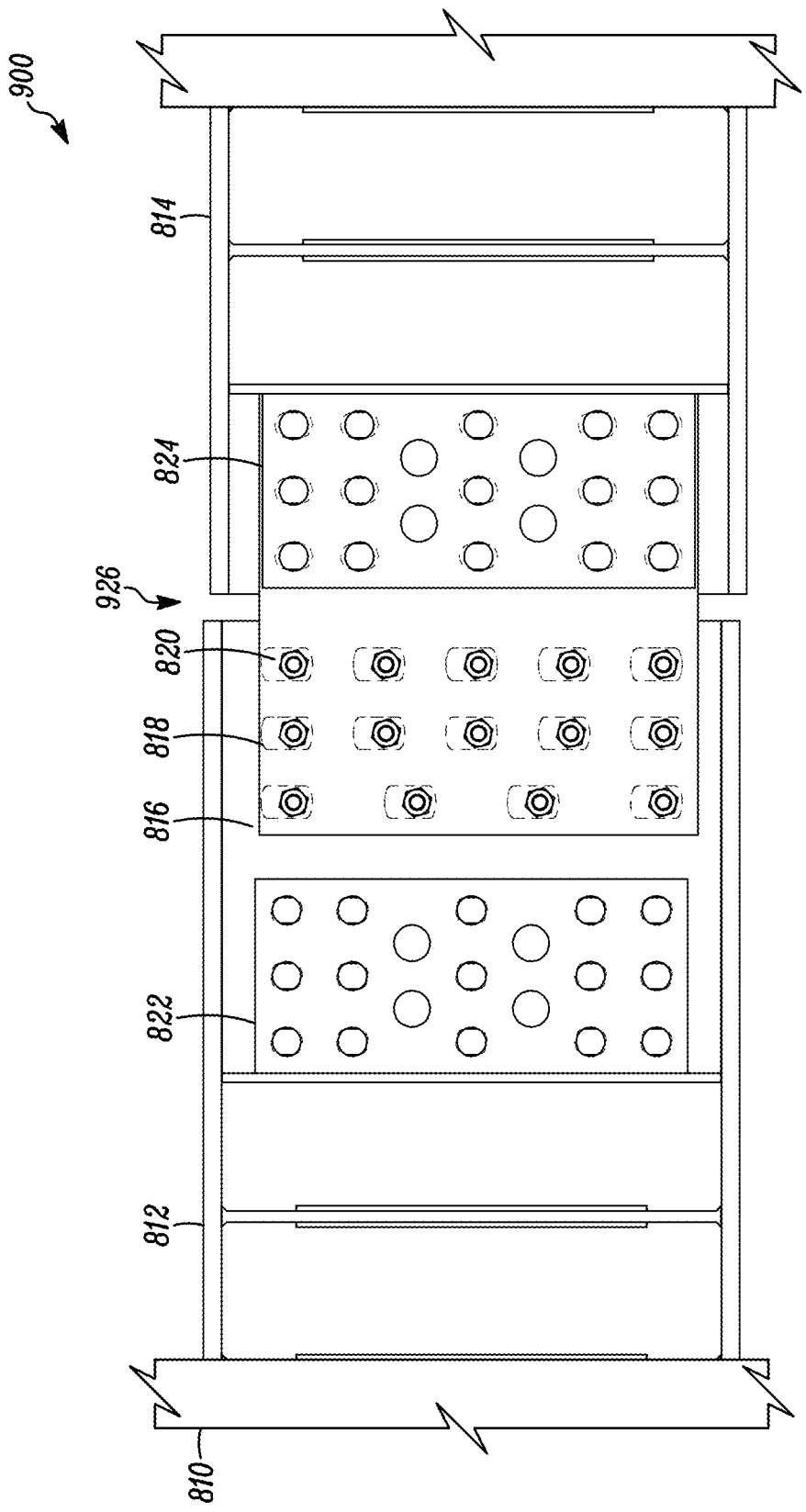
FIG. 9 shows a front view of the coupling member including slots and bolts when locking starts due to damage incident according to one embodiment of the invention.
Figure 10:
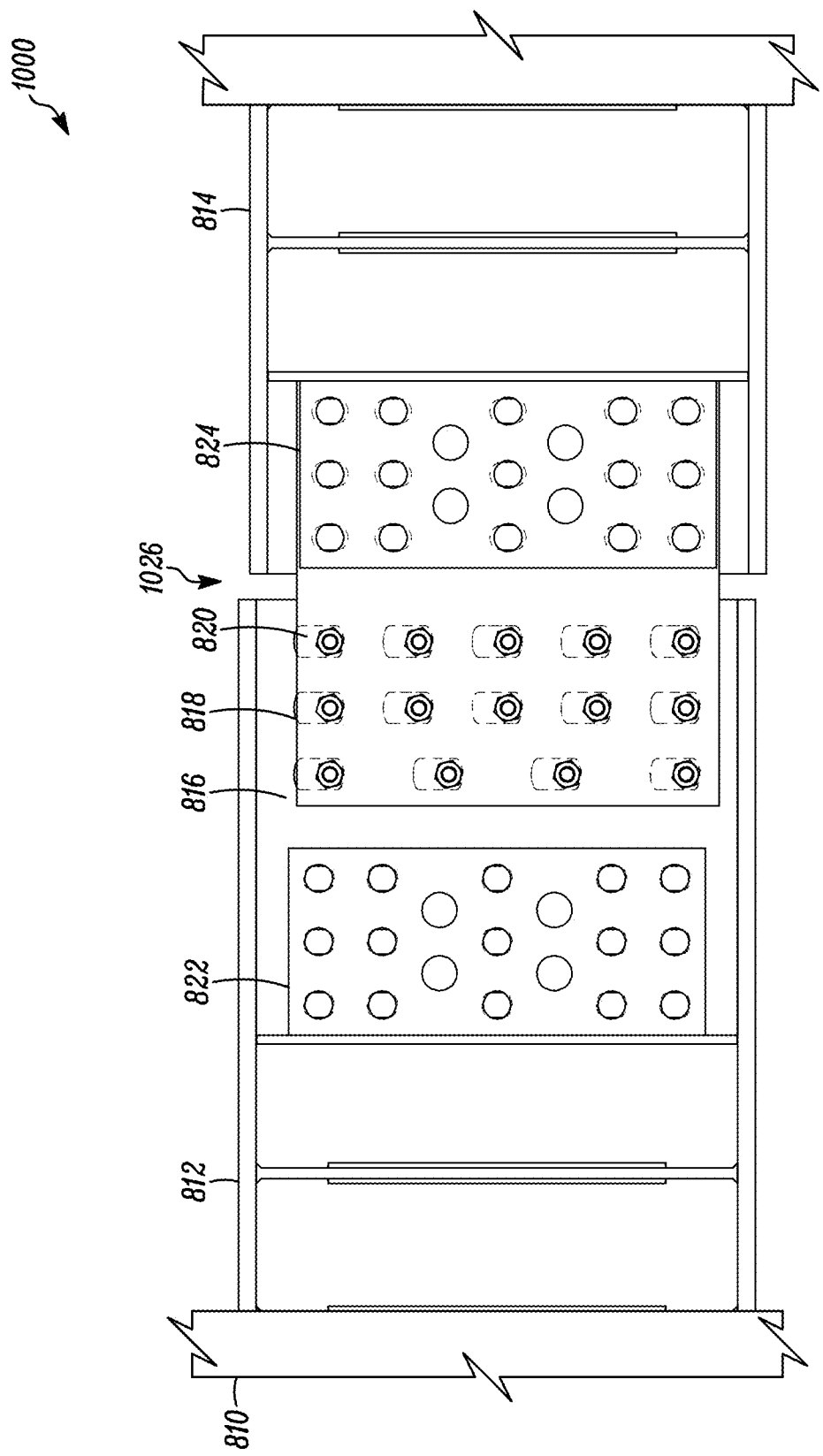
FIG. 10 shows a front view of the coupling member including slots and bolts when both ends are locked up due to damage incident according to one embodiment of the invention.

Referring now to FIGS. 9 and 10, front and back views of the coupling member (900 and 1000, respectively) are shown as extreme loads, such as from an earthquake, are placed on the structure. Again, the damper is not shown so that the lock-up function can be seen. The viscoelastic member undergoes a maximum displacement until bolts 820 are displaced to the point of engaging with an inner wall of a respective slot 818. At this point, further deformation of the damper and viscoelastic material is prevented, and forces are transmitted from the steel plate comprising the slots 818, through the bolts 820 and cover plate 816, and to the coupling member itself. In this manner, the damper is limited from critical failure. In case of vertical arrangement of the viscoelastic coupling damper, the slots 818 are perpendicular to the VCD and the bolts 820 are moving in the vertical direction (as illustrated in FIG. 10). In case of horizontal arrangement of the viscoelastic coupling damper, the slots 818 are perpendicular to the VCD and the bolts 820 are moving in the horizontal direction. Further, the size of the slot can also be varied based on the requirement of building structure. If the building structure is built in the area of low-amplitude earthquake probable area (low risk), the slot size can be kept smaller. In another example, if the building structure is built in high earthquake risk area, where probabilities of high-amplitude earthquake are more than the slot size can be longer. The plurality of bolts 820 moves in the vertical direction (with respect to the coupling member) in the respective slots 818 to prevent the structure from damage. The gap 926 and 1026 are illustrative of some degree of deformation having occurred. In FIG. 10, the damping element (not shown) has reached its damage incident limit, and accordingly the lock-up state is reached. In embodiments where a fuse is also used, the fuses 812 and 814 undergo deformation to prevent the damping element from deforming any further once the lock-up state has been reached. In the exaggerated view shown, the cover plates 816 have been displaced to a maximum amount with respect to the connecting element 880 in the vertical direction.

While the invention as described above relates to a coupling member for connecting two vertical elements in a building structure, applicant notes that the coupling member as herein described may be used or otherwise applied to various implementations where damping vibrations due to lateral loads may be required. In this sense, the term vertical elements as used throughout this description is intended to be construed broadly to include any structural elements that provide support due to lateral loads being applied to the building structure. Building structures of various types may benefit from the vertical element as herein disclosed.

EXAMPLES

The behavior of a building during an earthquake depends on several factors, stiffness, adequate lateral strength and ductility, simple and regular configurations. The use of viscoelastic coupling dampers arranged in building structures at different places, i.e., vertical or horizontal, depending on the type of building structure, such as low-rise, high-rise, reinforced concrete structure, etc. Further, in different arrangements, a lock-up test was also performed. The lock-up test was performed by applying 1000 kN to 2000 kN shear force by actuators. During the lock-up testing, the displacement on the viscoelastic coupling damper of the building structure occurred from 50 mm to 150 mm. The VCD hysteresis graph suggested that as the shear forces increases, the shear displacement increases.

Example 1

Figure 11:
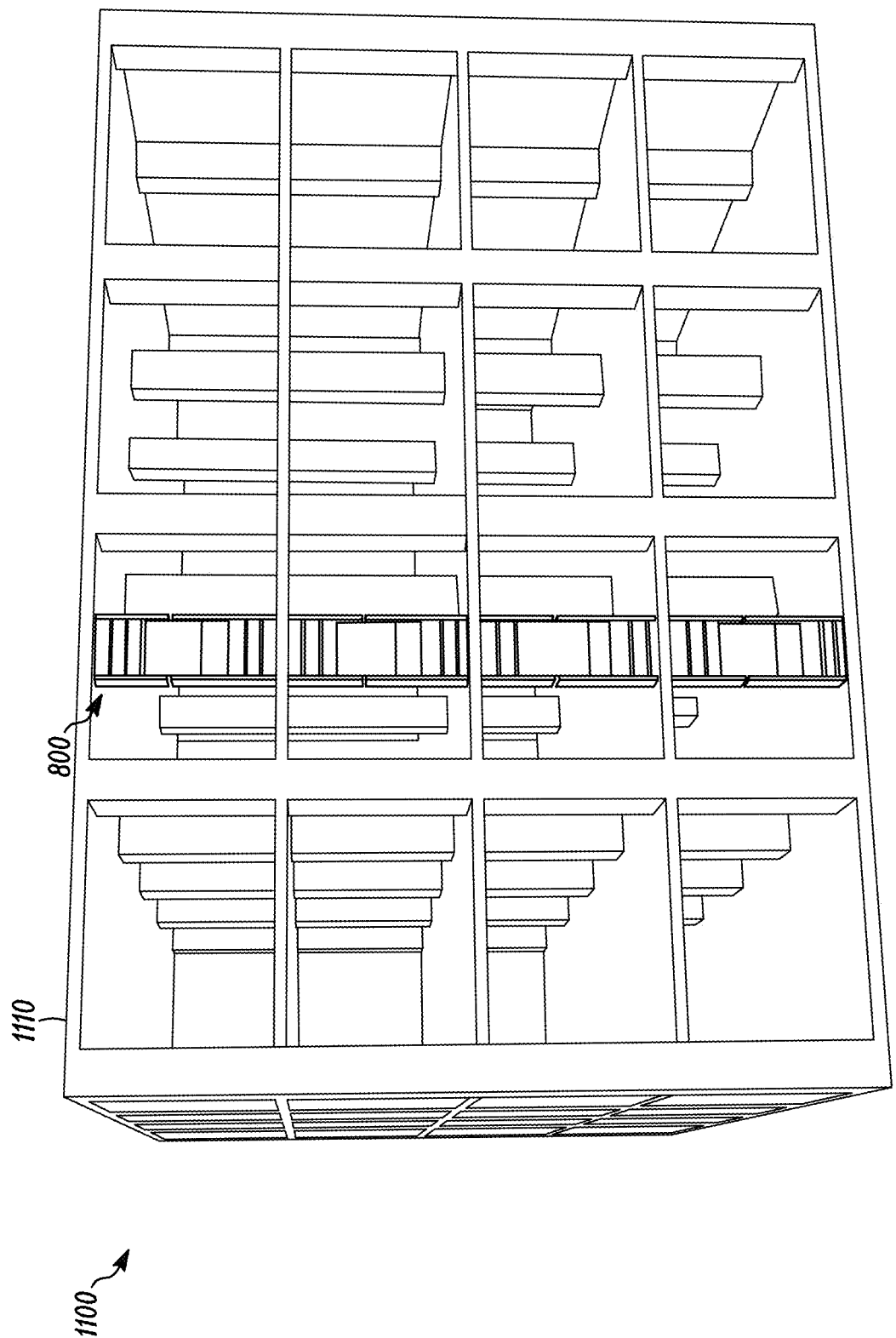
FIG. 11 shows a building structure to which embodiments of the invention may be applied.

FIG. 11 shows a building structure 1110 to which embodiments of the invention may be applied in a vertical arrangement. The viscoelastic coupling member 800 (the damper is not shown so that the lock-up is visible) is arranged between two floors. This particular arrangement is useful either for low-rise building structures or for reinforced concrete buildings. In case of earthquakes or wind blow the force and displacement is always in the perpendicular position. In the arrangement as shown in FIG. 11, the force will be in the parallel direction of the ground and displacement will be perpendicular to the direction of force.

Figure 12:
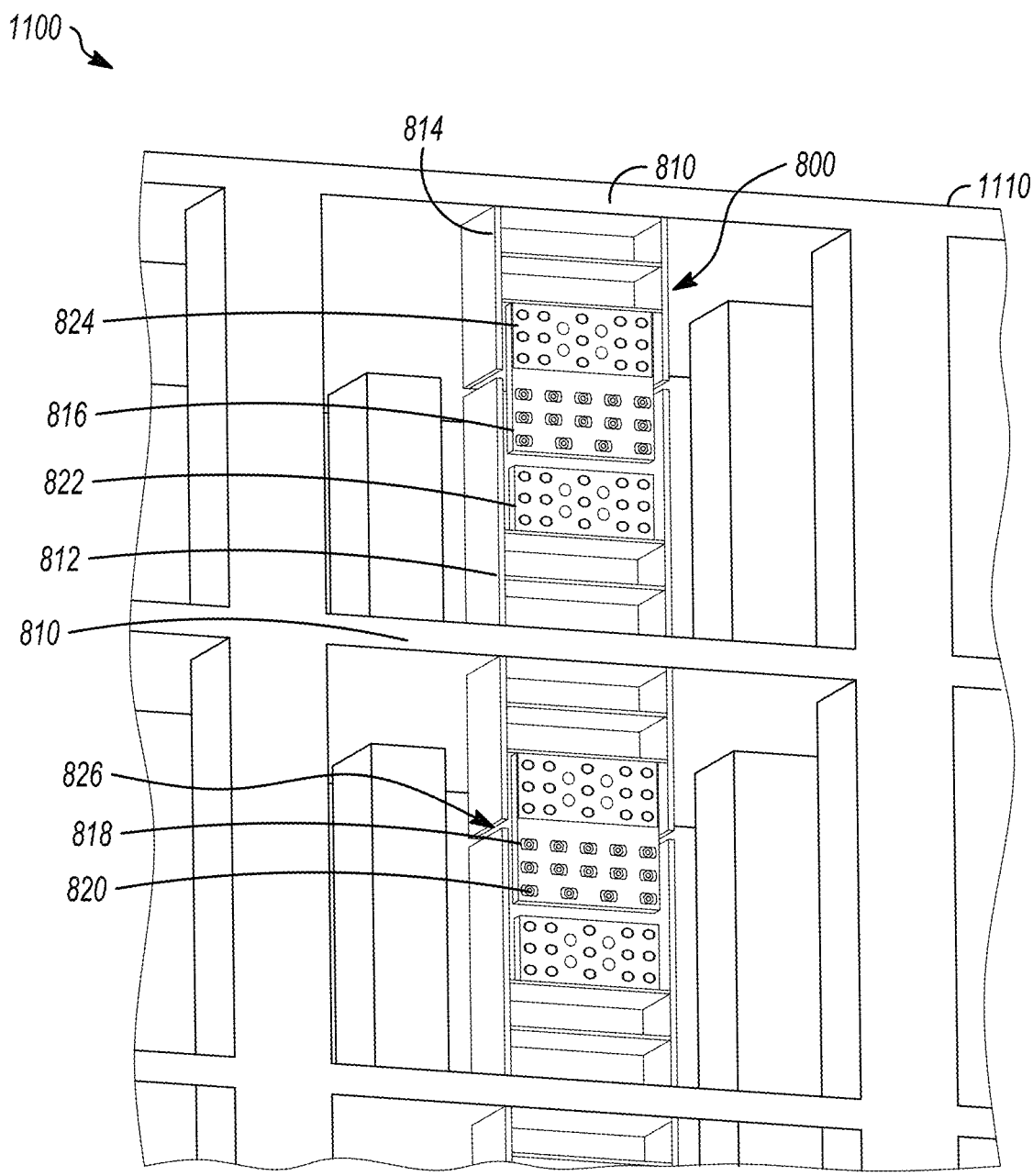
FIG. 12 is a detailed view of one coupling member in FIG. 11.

FIG. 12 shows a detailed view of two floors of FIG. 11, where numbering is as described above with respect to FIGS. 8A and 8B.

Example 2

Figure 13:
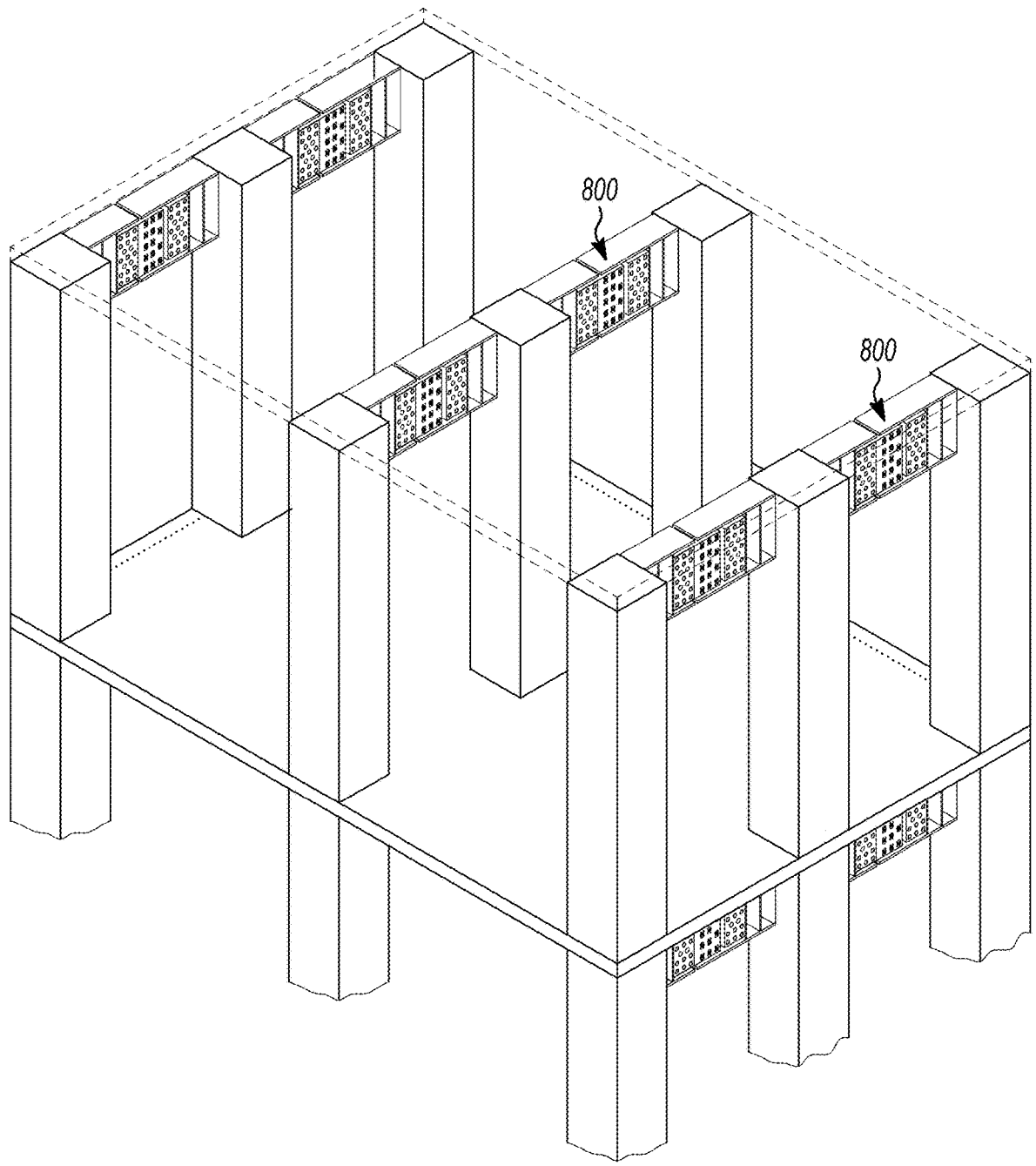
FIG. 13 shows another building structure in which embodiments of the invention may be implemented.
Figure 14:
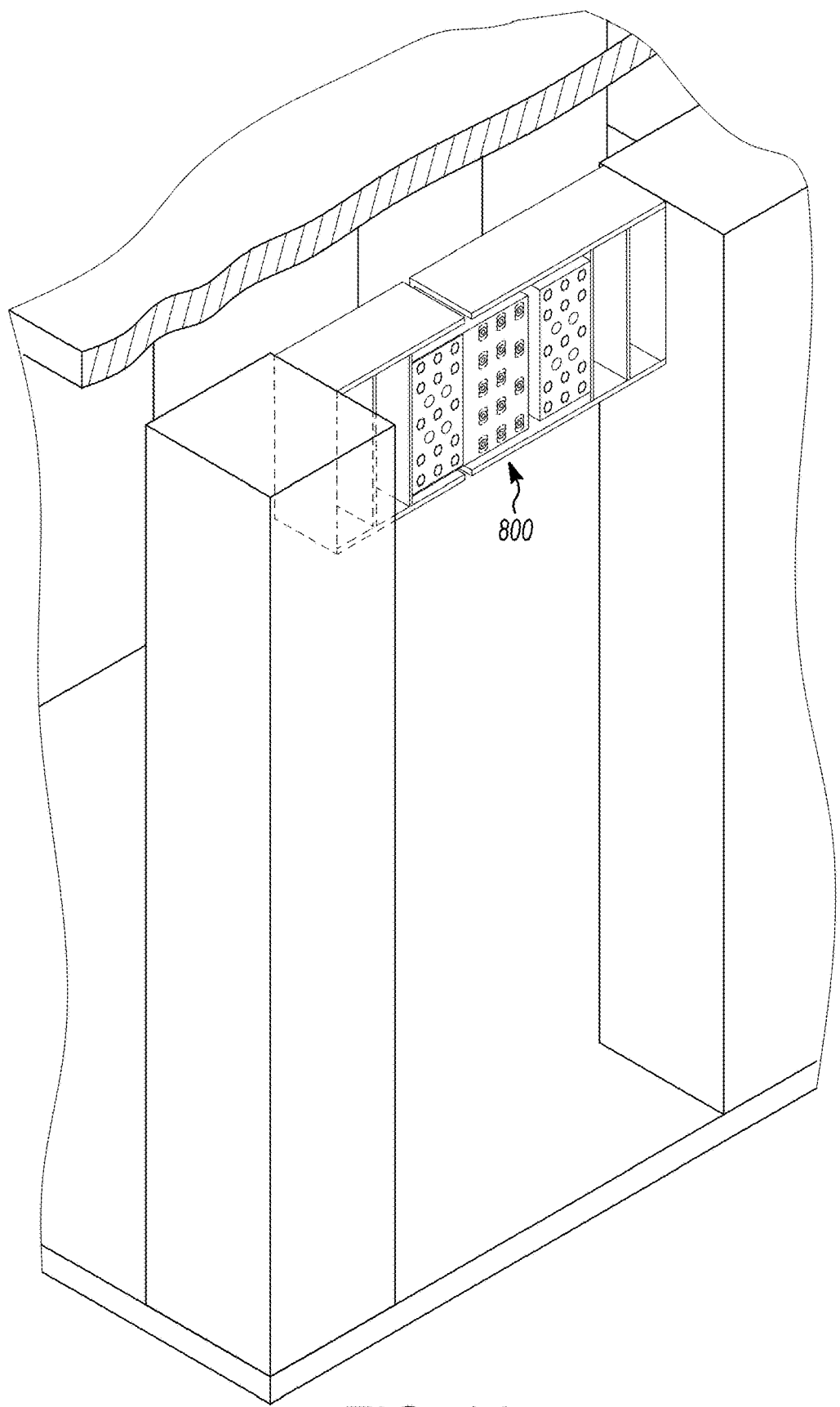
FIG. 14 is a detailed view of one coupling member in FIG. 13.

In another embodiment of the present invention as shown in FIGS. 13 and 14, the viscoelastic coupling member can be arranged horizontal to the building structure. Again, the damper is not shown. In this arrangement, the viscoelastic coupling member can be arranged in beam configuration, means it is arranged in between the two beams portions. In another arrangement, the viscoelastic coupling member can be placed in outrigger configuration, arranged in between the building structure and outrigger pillar (which is used to support the building structure). This particular arrangement is useful for high-rise building structures. The force will be in the perpendicular direction of the ground and displacement will be perpendicular to the direction of force, means it will be horizontal movement of the building structure or the viscoelastic coupling member.

The invention also provides for a method of connecting vertical elements in a building structure as heretofore described, by providing a coupling member according to any one of the various embodiments of the invention, and rigidly connecting two vertical elements in a building structure with the coupling member.

While the invention may be implemented using various damping members, surprising results have been discovered with respect to the combination of the damping member as described with respect to the preferred embodiments, where the risk of permanent deformation of the damping member due to elevated shear forces or moments may give rise to a damage incident. Generally, a damage incident would also include one at which the failure of the coupling element itself could be catastrophic. As previously stated, a damage incident is one that would cause permanent, near permanent and similar damage that renders the damping element inefficient. Such damage incidents include, but are not limited to, one or more of a ripping of the damping material in the damping element, debonding of damping material from a plate to which the damping material is connected, failure of a plate forming part of the damping element, failure of a means for connecting elements in the damping element, failure of a weld connecting the damping element or the column element, failure of vertical elements, and failure of a connecting means for the coupling member, failure of the vertical elements to which the damping device is connected or combination of same.

As will be appreciated by a person skilled in the art, although the fuse element does limit the forces that are applied on the damping element, there is still a small increase in the force as the yielding element deforms primarily due to strain hardening in the steel. This is very small and can be considered negligible for the purposes of this invention.

The scope of the claims should not be limited by the preferred embodiments set forth in description of the preferred embodiments or in the examples, but should be given the broadest interpretation consistent with the description as a whole.

What is claimed is:

1. An assembly for installation in a building structure for damping vibrations caused by a lateral load applied to the building structure, the assembly comprising:
    a first connecting element for connecting the assembly to a first element of the building structure and a second connecting element for connecting the assembly to a second element of the building structure, the assembly further comprising a damping element, the damping element comprising first and second sets of plates, the first set of plates of the damping element connected to the first connecting element and the second set of plates of the damping element connected to the second connecting element, the plates of the first set interdigitated with the plates of the second set with a damping material disposed between the plates thus interdigitated,
    the assembly comprising a plurality of slots in the first connecting element and a plurality of bolt holes in a cover plate connected to the second connecting element, with a bolt passing through each corresponding slot and bolt hole,
    wherein each bolt is displaceable along a length of its corresponding slot in response to an increase in shear deformation of the damping material, and at a maximum displacement the bolt engages an inner wall of its corresponding slot to prevent a further increase in shear deformation of the damping material.

2. The assembly of claim 1, wherein the damping material is a viscoelastic material.

3. The assembly of claim 1, wherein each slot comprises a straight portion extending parallel to an expected direction of shear loading of the damping element and perpendicular to a longitudinal axis of the damping element.

4. The assembly of claim 1, further comprising a static stiffness increasing structural member attached to a top surface of the damping element.

5. The assembly of claim 4, wherein the static stiffness increasing member comprises a steel plate.

6. The assembly of claim 1, wherein at least one of a first and second fuse member is connected to at least one of first and second ends of the damping element respectively and is made of a material sized and dimensioned to exhibit semi-rigid behavior when the damping element undergoes shear deformation below a predetermined load limit, and to undergo deformation when loads reach the predetermined load limit such that the damping element is prevented from deforming due to loads above the predetermined load limit.

7. A building structure including first and second elements extending from a ground surface with the first element connected to the second element by a coupling member, the coupling member comprising a first connecting element connected to the first element and a second connecting element connected to the second element, the coupling member further comprising a damping element for damping vibrations in the building structure, the damping element comprising first and second sets of plates, the first set of plates of the damping element connected to the first connecting element and the second set of plates of the damping element connected to the second connecting element, the plates of the first set interdigitated with the plates of the second set with a damping material disposed between the plates thus interdigitated,
    the coupling member comprising a plurality of slots in the first connecting element and a plurality of bolt holes in a cover plate connected to the second connecting element, with a bolt passing through each corresponding slot and bolt hole,
    wherein each bolt is displaceable along a length of its corresponding slot in response to an increase in shear deformation of the damping material, and at a maximum displacement the bolt engages an inner wall of its corresponding slot to prevent a further increase in shear deformation of the damping material.

8. The building structure of claim 7, wherein each slot comprises a straight portion extending parallel to a direction of a shear loading of the damping element and perpendicular to a longitudinal axis of the damping element.

9. The building structure of claim 7, wherein at least one of a first and second fuse member is connected to at least one of first and second ends of the damping element respectively and is made of a material sized and dimensioned to exhibit semi-rigid behavior when the damping element undergoes shear deformation below a predetermined load limit, and to undergo deformation when loads reach the predetermined load limit such that the damping element is prevented from deforming due to loads above the predetermined load limit.

10. The building structure of claim 7, wherein the damping material comprises a viscoelastic material.

11. The building structure of claim 7, according to claim 1, further comprising a static stiffness increasing structural member attached to a top surface of the damping element.

12. The building structure of claim 11, wherein the static stiffness increasing member comprises a steel plate.

* * * * *